Feb. 24, 1970 J. FAIRWEATHER ET AL 3,497,722
CIRCUIT FOR SWITCHING A SELECTED NUMBER OF PULSES AT ZERO CURRENT
Filed May 3, 1966
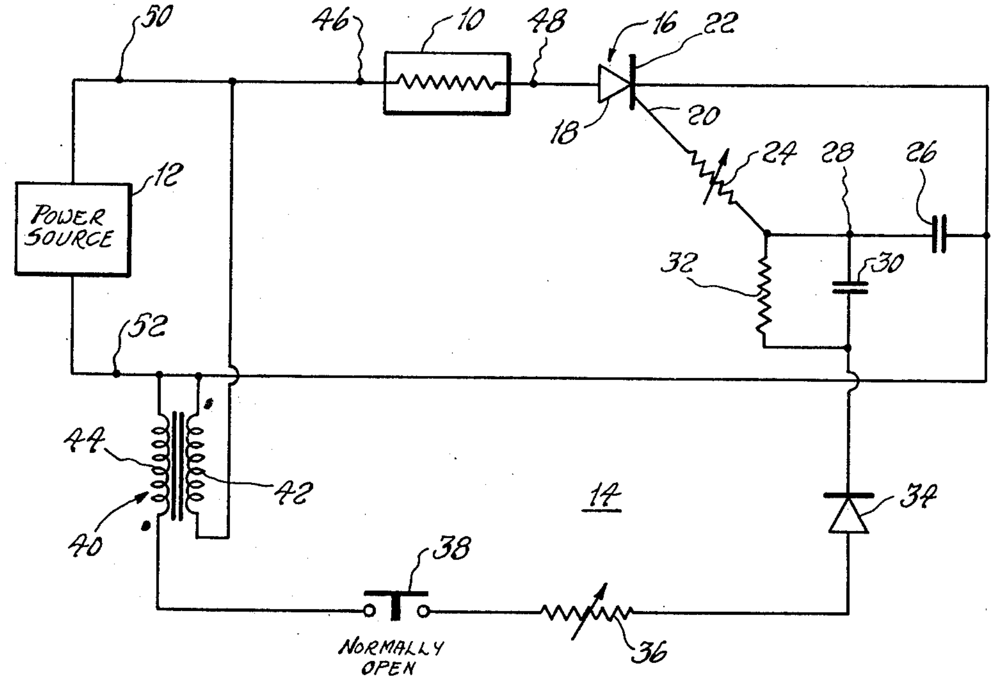
INVENTORS.
JOHN FAIRWEATHER
JACOB MONETA
BY
AGENT
ATTORNEY United States Patent Office 3,497,722

Patented Feb. 24, 1970

3,497,722

CIRCUIT FOR SWITCHING A SELECTED NUMBER OF PULSES AT ZERO CURRENT

John Fairweather, 843 Davis Ave., Uniondale, N.Y. 11553, and Jacob Moneta, 5525 Kings Highway, Brooklyn, N.Y. 11203

Filed May 3, 1966, Ser. No. 547,215

Int. Cl. H03k *17/02*

U.S. Cl. 307—252 4 Claims

ABSTRACT OF THE DISCLOSURE

An electronic circuit for switching on and off an alternating current source and a load at zero current, including a SCR in series with the source and load and a transformer for coupling some of the source energy to a gating circuit that includes, in series, a normally-open switch, an adjustable charging resistor, a diode for permitting current flow from the source to the gating circuit when the SCR blocks current flow from the source to the load, a charging capacitor shunted with a discharge resistor, and an adjustable resistor that connects to the gate of the SCR. A gating capacitor is connected between the cathode of the SCR and the charging capacitor. Energy is supplied to the gating circuit when the SCR cathode is positive and the SCR is gated on if the gating capacitor is sufficiently charged and the anode of the SCR is positive. The parameters of the charging capacitor, charging resistor, and the resistor connected to the gate determine the number of pulses delivered by the switching circuit from the source to the load.

The invention described herein may be manufactured and used by or for the Government of the United States of America for governmental purposes without the payment of any royalties thereon or therefor.

This invention relates to electrical switching circuits. Switching high power loads, particularly aboard ships presents a considerable radio interference problem. Switching of heavy alternating current loads through the use of large contactors or electronically through the use of silicon controlled rectifiers is random switching with respect to the instantaneous level of current; at the instant of switching the current level may be anywhere between peak and zero. The instantaneous rate of change in current, *di/dt*, at the instant of switching may be so great that a troublesome level radio frequency energy is radiated. No radio frequency energy is radiated if the switching occurs when the current passes through zero.

There are pulse equipments of high power that require one or a predetermined plurality of successive and complete power puses of a selected polarity for their operation. The pulse equipment may be an alternating current source or pulsating current source. There is no satisfactory fast-acting reliable non-complex equipment of reasonable cost available for switching when the current is essentially zero.

An object of this invention is to provide a fast-acting switching circuit capable of delivering from an AC or pulsating current source to a load, one or a selected number or a continuous succession of successive complete half cycles or pulses respectively of one polarity, a continuous succession of complete half cycles of the same polarity.

A further object is to provide a switching circuit as above which is reliable, non-complex, and of low cost.

Other objects and advantages will appear from the following description of an example of the invention, and the novel features will be particularly pointed out in the appended claims.

The single figure discloses a circuit diagram of an embodiment of this invention.

In the single figure there is shown an essentially resistive load 10 to be connected to and disconnected from alternating or pulsating current source 12. The power source may be of the type that provides house current AC, i.e. 60 cycle, 120 volt sinusoidal output or may be of the type that provides a pulse train output wherein the pulse train is of unidirectional or bidirectional polarity and square waveshape or other.

The switching circuit 14 includes a silicon-controlled rectifier 16, conventionally abbreviated SCR, having an anode 18, gate 20, and a cathode 22. The SCR is selected to satisfy the operating parameters, current, voltage, power, environmental temperature, etc. A selectively variable resistor 24 is connected at one end to the gate 20. A gating capacitor 26 is connected between the other end of resistor 24 and cathode 22. The relative positions of the variable resistor 24 and capacitor 26 between gate 20 and cathode 22 may not be reversed. To the junction 28 between variable resistor 24 and capacitor 26 there are connected in series a charging capacitor 30 bridged by a discharge resistor 32, a diode 34 arranged with its cathode between its anode and the junction 28, a selectively variable charging resistor 36, a "normally open" manually operable switch 38, and a low impedance means 40 responsive to the output of the power source 12 for supplying current pulses through diode 34 to the capacitors 26 and 30, alternately with positive pulses from the power source 12 across the anode-cathode of the SCR. The means 40 may be a pulse source synchronized with source 12 or may be part of an amplifier of which the power source 12 is also a part. The means 40 in the illustrated embodiment is a transformer, e.g. a filament transformer if the source 12 is a 120 volt, 60 cycle/second alternating current power supply, and having a primary winding 42 and a secondary winding 44. The secondary winding is connected in series with capacitor 30, diode 34, charging resistor 36, and switch 38. The circuit 14 is provided with terminals 46, 48 in series with the anode of the SCR, for connection to the load 10, and also is provided with terminals 50 and 52 for connection to the power source 12. The terminal 52 is in electrical common with the cathode of the SCR. The primary winding 42 is connected across the terminals 50 and 52. Where the power source 12 is an AC supply, the circuit "gates on" the SCR for one or more successive complete half cycles of the same polarity. The gating action is initiated by actuating switch 38. The circuit always gates on the SCR at or near the beginning of a positive half cycle independent of when the switch is closed during the two preceding half cycles. Depending on the adjustment of resistor 24 the SCR is gated on during every positive half cycle following the initial gated on half cycle or the SCR is gated on during a predetermined number of successive positive half cycles or is gated on during one positive half cycle. In the latter two examples, the SCR is not gated on again until the switch 38 is opened and then reclosed.

For the circuit to function as above, the capacitance of the charging capacitor 30 is many times that of gating capacitor 26. The circuit utilizes the fact that the gate-cathode impedance of an SCR when the gate is positive relative to the cathode is very low.

After the switch 38 has been open, the capacitors 26 and 30 are uncharged. When the switch is closed, positive half cycle impulses delivered by the secondary winding 44 cause current pulses to flow through the capacitor 30 and divide, part passing through capacitor 26 to return to the other side of secondary 44 and the remainder passing through the resistor 24 in series with the gate-cathode path of the SCR and thence to the other side of secondary 44. The capacitor 26 when uncharged is essentially a short circuit compared to resistor 24. During the first impulse the combination of capacitors 26 and 30 charge toward the pulse voltage. The total charge delivered to the capacitors is related to the pulse length, pulse amplitude, time constant of the combination of resistor 36 and capacitors 26 and 30. The voltages to which the capacitors 26 and 30 charge during a pulse while related to the inverse of the capacitances are not directly related to the inverse of their capacitances since an increasing percentage of the charging current through capacitor 30 is shunted by the resistor 24 and the gate-cathode of the SCR as the capacitor 26 becomes charged. As the pulse voltage passes its peak and decreases below the sum of the voltage across the capacitors, charging current to the capacitors ceases. Capacitor 26 discharges through resistor 24 and the gate-cathode path of the SCR. Some of the charge on capacitor 30 leaks off through resistor 32. Resistor 32 is selected so that the discharge time constant of capacitor 30 is many times longer than a pulse period. The discharge of the capacitors continues until discharged or until the next pulse delivered by the secondary winding. If the secondary winding 44 provides pulses continuously while the switch is closed, the capacitor is charged progressively, pulse by pulse. When the capacitor 30 is fully charged it is in a blocking state and will not allow capacitor 26 to charge though the switch 38 remains closed and the secondary 44 continues to provide pulses. More precisely, between positive pulses provided by secondary winding 44, some charge on capacitor 30 leaks off through resistor 32, whereby after the capacitor 30 is fully charged, some charging current flows through capacitor 30 during each successive positive pulse from secondary winding 44 and capacitor 26 is charged to a minor extent, not sufficient to gate on the SCR. Therefore, even if the switch is held closed after the capacitor 30 is fully charged, the SCR is not gated on again. The switch must be released for a time dependent on the circuit parameters and reactuated to again gate on the SCR.

The resistor 32 could be so connected as to discharge capacitor 30 only when switch 38 is open, through the use of a double-throw switch, not shown instead of a single-throw switch.

The SCR is gated on when the combination of gate-cathode voltage and gate current satisfies the gating requirements of the SCR and there is positive anode-cathode voltage across the SCR. In the illustrated embodiment the SCR is back biased when the secondary 44 delivers current pulses to the capacitors. Once gated on the SCR conducts until the anode-cathode voltage drops to zero. For any selected setting of resistance 24 there is a related voltage to which capacitor 26 must be charged in order to gate the SCR. However, when the capacitor 26 is partially charged but is not charged sufficiently for gating, it can be discharged through the gate-cathode of the SCR.

The circuit described can be designed to turn on the SCR for the duration of one positive pulse at the anode of the SCR or for any predetermined number of such positive pulses from power source 10 or for continuous operation. The time constant of resistor 24 and capacitor 26 must be less than the pulse period of the power source to preclude gating action by the capacitor 26 for more than one positive pulse at the anode of the SCR, after charging of the capacitor 26 is blocked by capacitor 30. Additionally, resistor 24 and capacitor 26 must be capable of supplying a combination gate current and gate voltage for gating on the SCR.

If it is desired that the circuit gate on the SCR for one pulse only, the combination of resistor 24, capacitor 30, and resistor 36 must have a time constant that is comparable to the length of a positive pulse supplied by the secondary winding 44 whereby the extent to which capacitor 30 is charged during one pulse precludes the delivery of sufficient charge to capacitor 26 during a succeeding pulse sufficient for charging capacitor 26 for gating on the SCR. To gate on the SCR for a successive plurality of pulses, the combination of resistor 24, capacitor 30, and resistor 36 must be designed or adjusted to have a time constant sufficiently longer than the pulse period to satisfy the requirement. Actually by adjusting resistor 24 from a low resistance to a high resistance the circuit is adjusted for one pulse a selected plurality of pulses or is gated on continuously.

Since the SCR open-circuits the resistive load and power source when the load current is essentially zero, no interference energy is radiated by the switching. Since the gating-on after the switch 38 is actuated follows a charging pulse, the SCR is gated on at the beginning of a pulse.

Four time constants need to be considered in this circuit. The first time constant is that of resistor 36 and capacitor 26 which shall be short enough for the capacitor to charge in part of the time of a positive impulse from secondary 44. The second time constant is that of resistor 24 and capacitor 26 which shall be long enough so as not to discharge to an extent that it cannot gate on the SCR in less than the time equal to the length of a positive impulse from the secondary winding 44. The third time constant is that of capacitor 30 resistor 24 and resistor 36 and shall be long enough to permit the desired number of pulses. The fourth time constant is that of capacitor 30 and resistor 32 and shall be long enough to permit capacitor 30 to discharge in up to about two seconds after switch 38 is open.

The following circuit parameters are suitable for where the power source is 60 cycle/second 120 volts alterating current:

| | |
|---|---|
| $R_{24}$ | 200 ohm pot. |
| $R_{32}$ | 400 ohms |
| $R_{36}$ | 100 ohm pot. |
| $C_{26}$ | 20 $\mu$fd., 15 volts |
| $C_{30}$ | 1000 $\mu$fd., 15 volts |
| SCR | 2N1772 |
| Diode | 1N540 |

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. An electronic switching circuit for connecting and disconnecting a 60 cycles/second and approxiamtely 120 volt alternating current power supply and a reesistive electrical load for N successive complete half-cycles of the same polarity where N is any whole number including zero, an SCR having anode, gate, and cathode, a selectively variable resistor connected at one end to the gate terminal, a gating capacitor connected in series with said cathode terminal and said variable resistor, a transformer having primary and secondary windings, a pair of load terminals and a pair of power terminals in series between said anode and cathode, said primary winding connected across said power terminals, a normally-open switch, a charging resistor, a diode and a charging capacitor series-connected between one end of the transformer secondary winding and the junction of said variable resistor and gating capacitor, a discharge resistor connected across said charging capacitor, the other end of the secondary winding being connected in common with that end of the primary winding connected to the cathode, whereby when an electrical load is connected between said load terminals and an alternating current power supply is connected across the primary winding, closing the switch, causes the load to be connected to the power supply at the beginning of a half cycle of positive polarity relative to the anode and for N succeeding complete half cycles of the same polarity where N is zero or any whole number and then disconnected and remaining so until the switch is opened and subsequently reclosed.

2. An electronic switching circuit as defined in claim 1 wherein the capacitance of the gating capacitor is a minor fraction of the capacitance of the charging capacitor.

3. An electronic switching circuit as defined in claim 2 wherein said gating capacitor and said charging capacitor are approximately 20 microfarads and 1000 microfarads respectively, said variable resistor is a potentiometer for providing up to approximately 200 ohms, said charging resistor is approximately 100 ohms, said discharge resistor is approximately 400 ohms, and said transformer is approximatelly 120 volts/5 volts.

4. An electronic switching circuit comprising:

an SCR having anode, gate, and cathode, a pair of load terminals and a pair of power terminals connected in series with said anode and cathode, a selectively variable resistor connected at one end to the gate terminal, a gating capacitor connected in series with said cathode terminal and said variable resistor, a manually-operable switch, a charging resistor, a diode for preventing the gate from being driven negative to the cathode, a charging capacitor shunted by a discharge resistor, serially connected together and to the junction of the selectively variable resistor and the gating capacitor, and a transformer having a primary winding connected across the power terminals and a secondary winding connected between the cathode of the SCR and the manually-operable switch for delivering positive pulses to the capacitors as the anode of the SCR is driven negative.

References Cited

UNITED STATES PATENTS

| | | | |
|---|---|---|---|
| Re. 26,119 | 12/1966 | Slater | 307—252 |
| 2,165,048 | 7/1939 | Gulliksen | 328—86 |
| 2,228,844 | 1/1941 | Palmer | 328—74 |
| 2,269,151 | 1/1942 | Garman | 328—74 |
| 3,411,020 | 11/1968 | Lake | 307—252 |
| 3,412,314 | 11/1968 | Crane | 307—252 |

DONALD D. FORRER, Primary Examiner

R. L. WOODBRIDGE, Assistant Examiner

U.S. Cl. X.R.

307—293; 328—77, 86, 129